United States Patent

Tokarz et al.

[15] 3,699,200

[45] Oct. 17, 1972

[54] HIGH-RESISTANCE ELECTRICAL CONDUCTOR ENCAPSULATION

[72] Inventors: Richard D. Tokarz; Joseph E. Kaveckis, both of Richland, Wash.

[73] Assignee: The United States of America as represented by the United States Atomic Energy Commission

[22] Filed: March 19, 1970

[21] Appl. No.: 20,968

[52] U.S. Cl. ..................264/102, 264/112, 264/255, 264/272

[51] Int. Cl. ..............................................B29d 3/00

[58] Field of Search...............264/255, 272, 102, 112

[56] References Cited

UNITED STATES PATENTS

| | | | |
|---|---|---|---|
| 3,608,029 | 9/1972 | Hourgh | 264/272 X |
| 2,941,905 | 6/1960 | Hofmann | 264/272 X |
| 3,030,597 | 4/1962 | Piaia, Jr. et al. | 264/272 X |
| 3,364,567 | 1/1968 | Brown et al. | 264/255 X |
| 2,956,976 | 10/1960 | Peciura | 260/31.8 X |
| 3,328,512 | 6/1967 | Lembke et al. | 174/72 |
| 3,517,111 | 6/1970 | Johnson | 264/272 X |

OTHER PUBLICATIONS

" Make Early Decisions Count–Choose the Proper Process," Electronic Design 3, Feb. 1, 1968, pp. 50–59, 70–79, TK7800E51

*Primary Examiner*—Robert F. White
*Assistant Examiner*—Allen M. Sokal
*Attorney*—Roland A. Anderson

[57] ABSTRACT

A structure for encapsulating a connector assembly so as to provide a very high resistance between the conductors and between the conductors and ground is provided. The encapsulating structure includes a combination of at least two layers of epoxy resins with at least one layer having a dehydrating agent.

1 Claim, 2 Drawing Figures

Inventor
Richard D. Tokarz
Joseph E. Kaveckis

Attorney

HIGH-RESISTANCE ELECTRICAL CONDUCTOR ENCAPSULATION

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

A leakage current usually exists between conductors connected to an electrical device and from the conductors to ground. The magnitude of this leakage current is determined by the insulation between the conductors and from the conductors to ground. The leakage current is a particular problem at the point where a connection is made to the electrical device through a connector, as the normal conductor insulation is absent at this point.

Where the electrical device is a measuring instrument, the leakage current can be very serious and cause the measurements to be inaccurate. In order to reduce the leakage current, the point at which the connection is made is normally encapsulated with an insulating material having a very high resistance. While this method may produce satisfactory results, in many applications, where the environment is extremely humid with a relatively high temperature and where the resistance between the conductors must be extremely high, the normal encapsulation methods may not produce satisfactory results.

It is therefore an object of this invention to provide an improved encapsulating structure for a connector assembly.

Another object of this invention is to provide an encapsulating structure for conductors connected to an electrical device operable in a high-humidity, high-temperature environment.

SUMMARY OF THE INVENTION

In practicing this invention, the conductors are electrically connected to pin terminals in the connector. The electrical device itself is hermetically sealed with a header and only the pin terminals extending through the header are exposed to the outside environment. The pin terminals extending from the header are encapsulated with a layer of a first epoxy resin which is permitted to cure. After curing, a dehydrating agent is placed on top of the first layer of epoxy resin and a second layer of epoxy resin material is used to fill the voids in the dehydrating agent.

The epoxy resin material provides a very high resistance and is relatively impervious to the high humidity. However, during the curing process of the epoxy resin, water is released and the catalyst used may collect at an interface which would provide a relatively low resistance path between the conductors. The drying agent absorbs the moisture and the catalyst to prevent formation of this relatively low-resistance path. After curing, a third layer of epoxy resin may be placed on top of the second layer if desired.

BRIEF DESCRIPTION OF THE DRAWINGS

The invention is illustrated in the drawings, of which.

DETAILED DESCRIPTION OF THE INVENTION

Figures 1, 2:
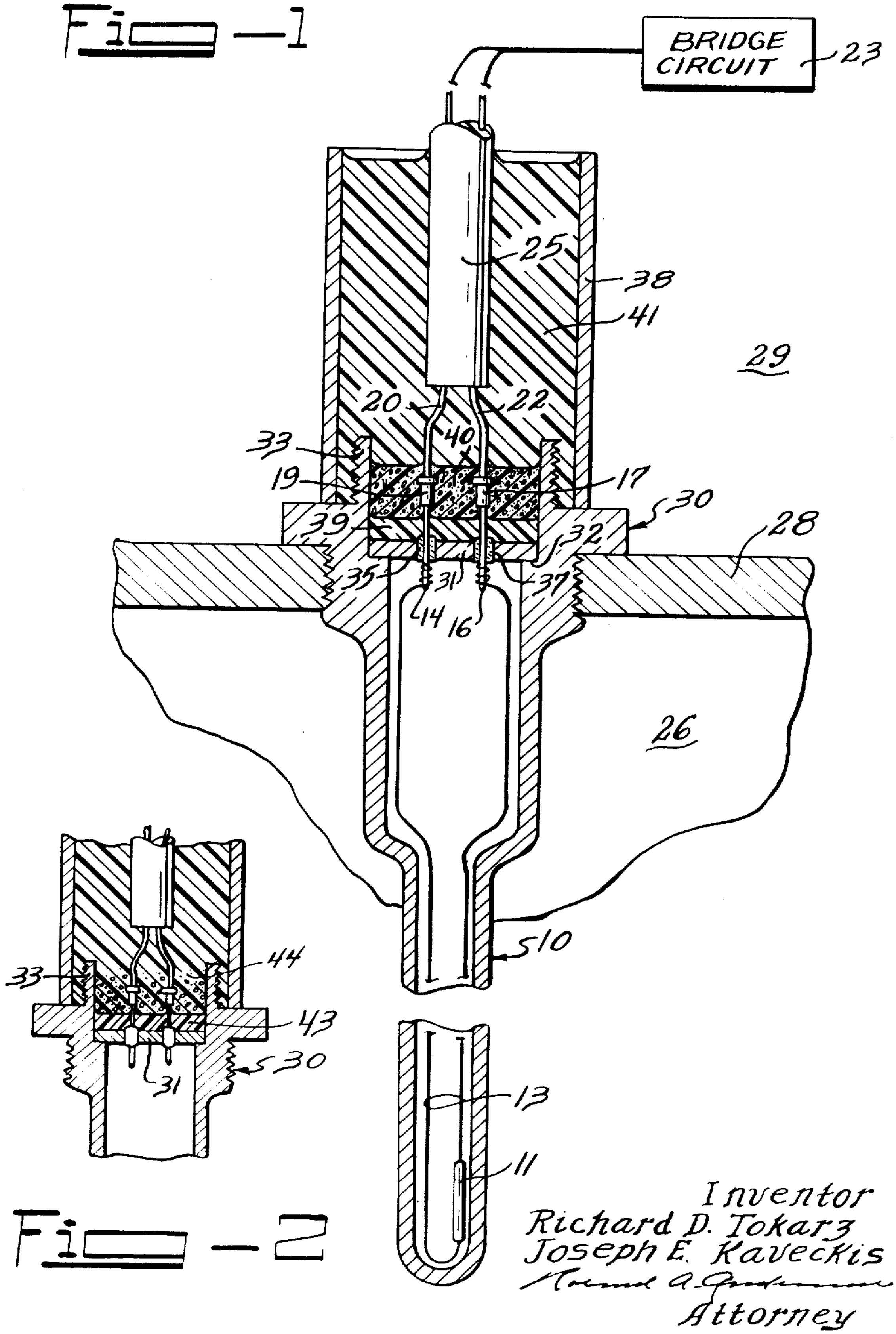
FIG. 1 is a cross-section view of a connector encapsulation incorporating the features of this invention.
FIG. 2 is a cross-section view of an alternate encapsulation structure incorporating the features of this invention.

As shown in FIG. 1, an immersion resistance temperature detector 10 is inserted in a fluid 26 to measure the temperature of the fluid. The interior of the detector 10 is hollow and includes a resistance 11 of the order of 100 ohms which is heated by the fluid 26. The resistance is connected through wires 13, terminal pins 14 and 16, connectors 17 and 19 and wires 20 and 22 to a bridge circuit 23. Changes in the resistance of resistor 11 caused by changes in the fluid 26 temperature unbalance bridge circuit 23 to give an indication of the temperature of fluid.

Fluid 26, which may be a fluid used in a reactor, is separated from the outside atmosphere by a wall 28. The environment 29 outside of the reactor is usually at an elevated temperature with the humidity approaching 100 percent. Since the temperature detector acts by measuring changes in resistance, it is important that the resistance to ground of the leads to the detector be held constant and at a very high value, as small changes in the resistance to ground will adversely affect the bridge circuit and give rise to unacceptable inaccuracies in the temperature measurements.

In a specific example of a device using this encapsulation method, the resistance from the leads to ground must be of the order of $10^9$ to $10^{10}$ ohms for proper operation. In order to maintain the high resistance values required, it is necessary to encapsulate the wires at the connector to prevent the entrance of moisture and the formation of moisture paths between the conductors and ground. Conventional encapsulation techniques have been used, including the use of epoxy resins, but the connections have deteriorated within a few months to a point where the detector was no longer usable. The invention described has maintained a high resistance to ground after operation over one year in a live steam environment with a 70° C. to 80° C. temperature differential across the connector.

The connector body 30 has a header 31 roll sealed to shoulder 32. The header 31 together with the wall 33 of the connector form a cavity. The size of the cavity may be increased by the use of a tube 38 which surrounds the wall 33 and is spaced away from them. Header 31 is of conventional design and is formed of a metal, such as a gold plated nickel-iron. Glass or ceramic inserts 35 and 37 receive terminal pins 14 and 16 and act to insulate them from the header. Detector 10 and connector body 30 are formed from a single piece of bar stock. Detector 10, the bottom portion of the connector 30 and header 31 form a hermetically sealed enclosure which is not affected by the outside environment. Terminal pins 14 and 16 provide means whereby electrical connections can be made to devices within the sealed enclosure. However, the terminal pins 14 and 16, connectors 17 and 19 and uninsulated portions of conductors 20 and 22 are exposed to the outside environment and must be covered in some manner to maintain the high insulation required. It is particularly important that the surface of the header be kept free of moisture, as the path from terminal pins 14 and 16 across the insulating inserts 35 and 37 to header 31 is very short.

In order to properly encapsulate the connector, the following method is used. The conductors 20 and 22 are connected to terminal pins 14 and 16 by connectors 17 and 19 which may be conventional commercially available connectors. Other methods of connecting wires 20 and 22 may also be used if the connection is clean and void-free. The wire connections are covered with solder to form a void-free area so that moisture cannot collect at these points. The entire assembly is then cleaned so that there will be a good bond between the epoxy resins used for encapsulation and the connector. The cleaning may include sandblasting, etching and chemical cleaning to remove flux and any other contaminants and to provide a good bonding surface for the epoxy resins.

The assembly is then placed in a vacuum oven and heated to 150° C. and vacuum cycled from atmospheric pressure to 500 microns (nominal) to outgas the connector. The connector 30 is then heated to 75° C. and the header 31 and pin terminals 35 and 37 are covered with a first layer of epoxy resin 39. The epoxy resin used in the first layer must have good bonding along the interface with the header to prevent the formation of voids, high electrical resistivity, a thermal coefficient of expansion substantially equal to the thermal coefficient of expansion of the connector and a low water migration rate. A material having these characteristics is an epoxy resin with an aluminum oxide filler and an anhydride catalyst. The connector assembly is vacuum cycled to 29 to 30 inches Hg and then cured.

After curing the first layer of epoxy resin 39, a second layer 40 is formed. The second layer covers the first and an additional portion of the terminal pins and conductors and connectors. The second layer 40 consists of a drying agent in granular form which may be, for example, synthetic aluminum silicate. Other drying agents may be used if desired. A second layer of an epoxy resin is poured over the drying agent to completely fill all voids in the granular layer of the drying agent. The epoxy resin used in the second layer should have a thermal coefficient of expansion substantially equal to the thermal coefficient of expansion of the connector, a low water migration rate, high electrical resistivity and must also not affect the drying agent with which it is mixed. A material having good characteristics is an epoxy resin with a talc filler and a catalyst of an aromatic amine. The connector assembly is again outgassed in a vacuum chamber by cycling the connector to 26 to 28 inches Hg and then cured.

The drying agent acts to pick up the catalyst in the second layer so that it is not present at the interface between the first layer 39 and the second layer 40. Catalyst present at this layer acts to decrease the insulation resistance to ground at elevated temperatures. The drying agent also picks up moisture from the resin to prevent this moisture from migrating to the interface.

The connector is again heated to 75° C. and a third layer of epoxy 41 is used to cover the remaining portion of conductors 20 and 22 and wire 25 to complete the encapsulation. Epoxy 41 also fills in the space between walls 33 and tube 38. The material used in the third layer should have the characteristics of the material used in the first layer and the same epoxy resin and catalyst may be used. The connector assembly is vacuum cycled to 29 to 30 inches Hg and then cured.

Referring to FIG. 2, there is shown an alternate method of encapsulation. In the method of FIG. 2, the first layer 43 is the same as the first layer 31 of FIG. 1 and is formed in the same manner. The second layer 44 is formed by placing a layer of granular material and filling with an epoxy material as in forming the second layer 40 of FIG. 1. The second layer is continued until it fills the connector cavity. The connector assembly is then outgassed and the second layer is cured as before. Thus only two layers are used, with the second layer containing the drying agent. The drying agent fills only a portion of the cavity, with the epoxy resin of the second layer filling the entire cavity.

The embodiments of the invention in which an exclusive property or privilege is claimed are defined as follows:

1. A method of encapsulating a connector assembly, the connector assembly including a conductor having an insulated section and further an uninsulated section connected to a terminal pin within a cavity of an electrical connector, the terminal pin being positioned on a sealed insulating header and extending therethrough, including the steps of:

a. cleaning the connector assembly;

b. covering the header with a first layer of a thermal setting resin having a high electrical resistivity, a low water migration rate and a thermal coefficient of expansion substantially equal to the thermal coefficient of expansion of the connector, said first layer consisting of a first epoxy resin with an aluminum oxide filler and an anhydride catalyst;

c. outgassing said first layer;

d. curing said first layer;

e. covering said first layer with a second layer of synthetic aluminum silicate in granular form and covering said layer of synthetic aluminum silicate with a second epoxy resin to fill the voids in said second layer, said second epoxy resin having the characteristics of said first epoxy resin and further having a talc filler and an aromatic amine catalyst;

f. outgassing said second layer; and g. curing said second layer.

* * * * *